(12) United States Patent
Annamalai Thangaraj et al.

(10) Patent No.: US 10,956,094 B2
(45) Date of Patent: Mar. 23, 2021

(54) SYSTEMS AND METHODS FOR PROVIDING ASSISTANCE THROUGH ONE OR MORE VOICE-BASED INSTRUCTIONS VIA MULTI-FUNCTION DEVICE

(71) Applicant: XEROX CORPORATION, Norwalk, CT (US)

(72) Inventors: Sathish Kumar Annamalai Thangaraj, Chennai (IN); Brindha Brammanayagam, Chennai (IN); Purushothaman Jayakumar, Chennai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/290,999

(22) Filed: Mar. 4, 2019

(65) Prior Publication Data
US 2020/0285427 A1    Sep. 10, 2020

(51) Int. Cl.
| G06F 3/12 | (2006.01) |
| G06F 3/16 | (2006.01) |
| H04N 1/00 | (2006.01) |
| G06K 15/02 | (2006.01) |

(52) U.S. Cl.
CPC .......... *G06F 3/1205* (2013.01); *G06F 3/1206* (2013.01); *G06F 3/1253* (2013.01); *G06F 3/1292* (2013.01); *G06F 3/167* (2013.01); *H04N 1/00395* (2013.01); *H04N 1/00403* (2013.01); *H04N 1/00477* (2013.01)

(58) Field of Classification Search
None
See application file for complete search history.

(56) References Cited

U.S. PATENT DOCUMENTS

| 6,701,095 B1 * | 3/2004 | Fujimoto | G06F 11/0733 399/18 |
| 7,996,269 B2 * | 8/2011 | Inouye | H04N 1/00307 705/26.1 |
| 2002/0181010 A1 * | 12/2002 | Pineau | G06F 3/1292 358/1.15 |
| 2003/0005050 A1 * | 1/2003 | Pineau | H04L 67/28 709/203 |

(Continued)

FOREIGN PATENT DOCUMENTS

| JP | H 11313187 | * 11/1999 | H04N 1/00 |
| JP | 2010049493 | * 3/2010 | G05B 23/02 |

*Primary Examiner* — Beniyam Menberu

(57) ABSTRACT

The disclosure discloses methods and systems for assisting users via interactive voice-based job-related instructions. The method includes receiving a job having one or more attributes. A call from a mobile device of the user is received and a connection is established between the mobile device and a multi-function device. It is then checked whether the mobile device is a registered mobile device. Based on the check, an interactive voice response unit is automatically activated over the established the call. Then, one or more voice-based instructions are sent to change at least one attribute related to the job. Based on the voice-based instructions, an input key submitted through the mobile device is received to change the at least one attribute. The at least one attribute is changed at the multi-function device in real-time. Finally, the job is printed in accordance with the at least one changed attribute and remaining attributes.

32 Claims, 10 Drawing Sheets

(56) References Cited

U.S. PATENT DOCUMENTS

| | | | |
|---|---|---|---|
| 2004/0190042 A1* | 9/2004 | Ferlitsch | G06F 3/1285 358/1.15 |
| 2006/0227946 A1* | 10/2006 | Henderson | H04M 11/007 379/100.01 |
| 2007/0101415 A1* | 5/2007 | Masui | H04L 63/08 726/5 |
| 2007/0168190 A1* | 7/2007 | Itagaki | G10L 17/22 704/246 |
| 2008/0052710 A1* | 2/2008 | Iwai | G06F 3/121 718/100 |
| 2010/0238479 A1* | 9/2010 | Yamazaki | G06F 3/121 358/1.14 |
| 2011/0170138 A1* | 7/2011 | Takahashi | H04N 1/00384 358/1.15 |
| 2013/0155442 A1* | 6/2013 | Kuppuswamy | H04N 1/00344 358/1.14 |
| 2014/0006600 A1* | 1/2014 | Hong | G06F 9/542 709/224 |
| 2016/0011830 A1* | 1/2016 | Asakura | G06F 3/1292 358/1.15 |

* cited by examiner

SYSTEMS AND METHODS FOR PROVIDING ASSISTANCE THROUGH ONE OR MORE VOICE-BASED INSTRUCTIONS VIA MULTI-FUNCTION DEVICE

CROSS-REFERENCE TO RELATED APPLICATIONS

Cross-referenced is commonly assigned, entitled "Systems and Methods for Assisting Users through Interactive Voice-Based Job-Related Instructions via Multi-Function Device" (Ser. No. 16/290,998).

TECHNICAL FIELD

The present disclosure relates to the field of multi-function devices, more specifically, relates to methods and systems for providing assistance through voice-based instructions related to jobs.

BACKGROUND

Multi-function devices have gained popularity due to their wide variety of features and functions and thus, have become the need of every business, be it small or big. A multi-function device incorporates the functionality of multiple devices into a single device including a printer, a scanner, a copier, and a fax machine. Generally, the multi-function device is used by sighted users but can also be used by visually impaired users. To assist the visually impaired users, braille supported devices, or 508 enabled devices are provided to provide their inputs to the multi-function device or to read their printed version/output in a better fashion. To use such services, the visually impaired users need to handle several navigations.

It is always difficult for the visually impaired users to handle submitted/processing jobs in the multi-function device. Though the visually impaired users have some easier options to submit secure print jobs (via print drivers) but they still face difficulty while handling the submitted secure print jobs. For example, after sending the secure print jobs, a visually impaired user may need to release his job using a smart card or using a braille keyboard. In both the releasing methods, the visually impaired user needs to navigate to corresponding screen to release his specific secure print job. In case the visually impaired user uses the braille keyboard to enter the secure print job's passcode, then the entered passcode may be easily exposed to other users.

Like the submitted jobs, the visually impaired user faces difficulty while handling his processing/progressing jobs in the multi-function device. If multiple jobs of different users are present in a job queue, then the visually impaired user does not know the details such as when his job will be completed, how much time it will take to complete, etc. Further, the visually impaired user is not sure about the resource availability for his job or is not sure about the current status of his job. Moreover, after completion of his job, it is difficult for the visually impaired user to find in which output tray the job is delivered and is equally difficult to trace the correct printouts among the delivered printouts of different users. Also, the visually impaired user does not know where the documents are getting delivered. However, if the visually impaired user is not able to confirm the delivery of the printed documents, it is necessary for the visually impaired user to query the contents of the printed documents from other users without visually impaired. Such a query work is a labor-intensive for the visually impaired user, thereby making the usage of the multi-function device difficult.

Similar problems associated with the submitted and/or progressing jobs can even be faced by sighted users. For example, they are not sure about the time for their jobs, which output tray will be used for delivering their printouts, and so forth. Once jobs are submitted, they may not be able to change the submitted attributes but if they are, the users have to access the multi-function device to complete the same. Therefore, there is a need for efficient methods and systems to address the above-mentioned problems in the state of the art.

SUMMARY

This summary is provided to introduce concepts related to methods and devices for assisting users via interactive voice-based instructions related to jobs. The concepts are further described below in the detailed description. This summary is not intended to identify essential features of the claimed subject matter nor is it intended for use in determining or limiting the scope of the claimed subject matter.

According to aspects illustrated herein, a method for providing real-time assistance by a multi-function device through one or more voice-based instructions is disclosed. The method includes receiving a job submitted by a user, the job has one or more attribute. A call from a mobile device of the user is received, the mobile device is associated with a mobile number. Then, a call connection is established between the mobile device and the multi-function device. It is then checked whether the mobile device is registered with a Light Weight Directory Access Protocol (LDAP) server coupled to the multi-function device, based on the mobile number and user details available with the LDAP server. An interactive voice response (IVR) unit is automatically activated over the established call to interact with the user through one or more voice-based instructions. The one or more voice-based instructions are sent to change at least one attribute related to the job, the one or more voice-based instructions are sent to the mobile device of the user over the established call. Based on the one or more voice-based instructions, an input key submitted through the mobile device of the user is received, to change the at least one attribute related to the job. Based on the received input key, the at least one attribute related to the job is changed at the multi-function device in real-time. Finally, the job is printed in accordance with the at least one changed attribute and remaining original attributes.

According to other aspects illustrated here, a method for providing real-time assistance by a multi-function device through one or more voice-based instructions, is disclosed. The method includes receiving a call through a registered mobile device of a user. A call connection is established between the mobile device and the multi-function device. Then, a job submitted by the user is fetched at the multi-function device. Then, an interactive voice response (IVR) unit is automatically activated over the established call to interact with the user through one or more voice-based instructions. A condition at the multi-function device is checked. Based on the condition check, the one or more voice-based instructions are transmitted to the mobile device of the user. An input key submitted through the mobile device of the user is received, based on the one or more voice-based instructions. Based on the received input key, an action is taken to fix the condition.

According to other aspects illustrated here, a method for providing real-time assistance by a multi-function device through one or more voice-based instructions, is disclosed. The method includes receiving a call through a registered mobile device of a user. A call connection is established between the mobile device and the multi-function device. Then, a job submitted by the user is fetched at the multi-function device, the job includes one or more attributes. Then, an interactive voice response (IVR) unit is automatically activated over the established call to interact with the user through one or more voice-based instructions. The one or more voice-based instructions are sent to the mobile device of the user over the established call, the one or more voice-based instructions relate to changing at least one job attribute. An input key submitted through the mobile device of the user is received to change the at least one job attribute. The at least one job attribute is changed based on the input key submitted through the mobile device of the user. The job is printed in accordance with the at least one changed attribute and remaining submitted attributes.

A system including a Light Weight Directory Access Protocol (LDAP) server, and a multi-function device, communicatively coupled to the LDAP server, is disclosed. The multi-function device includes a communication unit, a controller and an interactive voice response (IVR) unit. The LDAP server stores user details, a passcode and a mobile number associated with a mobile device of a user; and authenticates the user based on the mobile number and the user details. The communication unit receives a call from the mobile device of the user. The controller establishes a call connection between the mobile device and the multi-function device; checks the status of the job of the user; automatically activates an interactive voice response (IVR) unit over the established call to interact with the user through one or more voice-based instructions; changes the at least one attribute related to the job at the multi-function device in real-time; and prints the job in accordance with the at least one changed attribute and remaining attributes. The interactive voice response (IVR) unit sends the one or more voice-based instructions to the mobile device of the user over the established call to change the at least one attribute related to the job; and based on the one or more voice-based instructions, receives an input key through the mobile device of the user to change the at least one attribute related to the job.

A multi-function device including a communication unit, an interactive voice response (IVR) unit and a controller is disclosed. The communication unit receives a call from a mobile device of a user. The IVR unit sends one or more voice-based instructions to the mobile device of the user to change at least one submitted attribute related to the job; and based on the one or more voice-based instructions, receives an input key through the mobile device to change the at least one submitted attribute related to the job. The controller establishes a call connection between the mobile device and the multi-function device; automatically activates the interactive voice response (IVR) unit over the established call to interact with the user through the one or more voice-based instructions; checks the status of the job of the user at the multi-function device; changes the at least one submitted attribute related to the job at the multi-function device in real-time; and prints the job in accordance with the at least one changed attribute and remaining submitted attributes.

A non-transitory computer-readable medium comprising instructions executable by a processing resource, is disclosed. The processing resource receives a job submitted by a user, wherein the job includes one or more attributes; receives a call from a mobile device of the user, the mobile device is associated with a mobile number; establishes a call connection between the mobile device and the multi-function device; checks whether the mobile device is registered with a Light Weight Directory Access Protocol (LDAP) server coupled to the multi-function device, based on the mobile number and user details available with the multi-function device; checks the status of the job of the user at the multi-function device; automatically activates an interactive voice response (IVR) unit over the established call to interact with the user through one or more voice-based instructions; sends the one or more voice-based instructions to change at least one submitted attribute related to the job; based on the one or more voice-based instructions, receives an input key submitted through the mobile device to change the at least one submitted attribute related to the job; changes the at least one submitted attribute related to the job at the multi-function device in real-time; and prints the job in accordance with the at least one changed attribute and remaining submitted attributes.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein, wherein:

FIG. 2A illustrates an overall block diagram of a system for assisting users via voice-based instructions related to jobs, while

DESCRIPTION

Figure 1A:
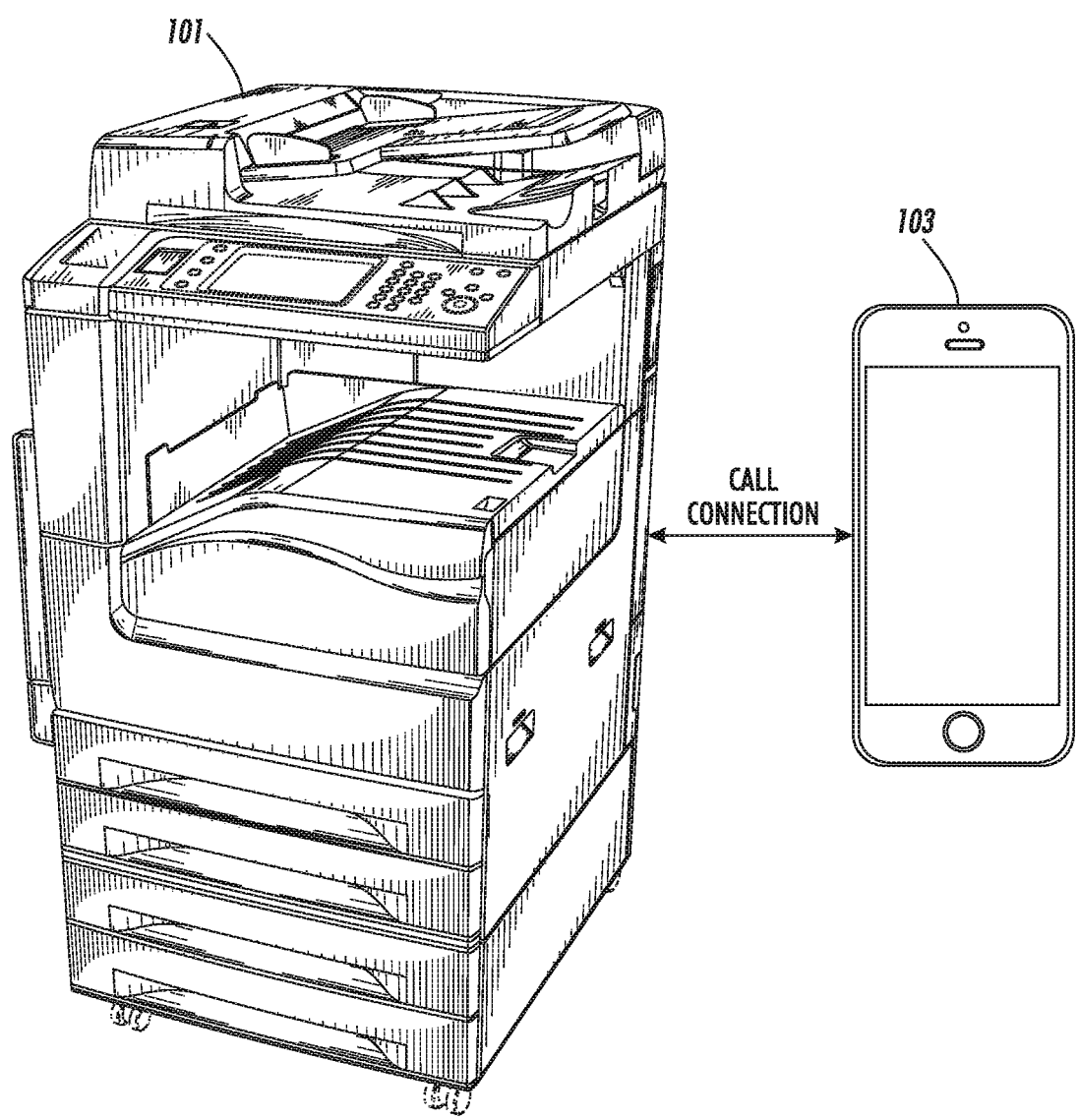
FIG. 1A shows an exemplary physical multi-function device and a mobile device.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity and are intended to include more examples than just provided below.

The term "multi-function device" refers to a device or a combination of multiple devices configured to perform one or more functions, but not limited to, scanning, printing, copying, imaging, and so forth. The multi-function device includes software, hardware, firmware, or combination thereof. In the context of the current disclosure, the multi-function device assists users via voice-based instructions related to jobs. The multi-function device transmits one or more voice-based instructions related to print jobs to a mobile device of a user. The one or more voice-based instructions are provided through an Interactive Voice Response (IVR) unit. Specifically, the multi-function device assists users for changing attributes related to a job using the mobile device.

The term "job" here includes a print job, which can be submitted through one or more ways, without limiting the scope of the disclosure.

The term "job attributes" includes parameters required for printing the job. The attributes may include, a multi-function device for printing the job, a number of copies to be printed, monochrome or colored print, an output tray and so on. The "job attributes" can simply be termed as attributes.

The term "voice-based instructions" include voice-based instructions or voice-based notifications for the user. The voice-based instructions are in the form of an audio message to which the user responds through the mobile device.

The term "input key" refers to a key submitted/pressed by the user through the mobile device based on the voice-based instructions. The input key may be a number, a character, a special alphabet, or a combination thereof. For example, the input key may be *1, #1, 1, *0, abc@123, or the like.

The term "users" include any users who submits print jobs to the multi-function device and/or all users who use the multi-function device on day-to-day usage. The users may be sighted users, visually impaired users or partially visually impaired users, without limiting the scope of the disclosure. The type of users does not interfere while implementing the present disclosure.

The term "a mobile device" refers to a device that the user typically uses for giving print commands and/or communicating with the multi-function device. For the visually impaired user or partially visually impaired users, the mobile device may be a braille-based mobile device. For other users, the mobile device may be, but is not limited to, a mobile phone, a tablet, a Personal Digital Assistant, a smart-phone or any other device capable of communication such as call. In context of the current disclosure, the mobile device receives one or more voice-based instructions related to jobs and further submits an input key to the multi-function device.

Overview

The present disclosure provides methods and systems for assisting users through one or more voice-based job-related instructions. The methods and systems assist the users to change one or more job attributes using a mobile device. This is performed by establishing a communication between the mobile device and a multi-function device. The methods and systems transmit one or more voice-based instructions to the mobile device of the user. The one or more voice instructions related to changing an attribute related to a job. Various examples of changing the attribute may be changing a print setting feature or changing the multi-function device by transferring the job to another multi-function device. Based on the one or more voice-based instructions, the user submits an input key to change at least one attribute related to the job through the mobile device. The input key relates to which attribute the user wishes to change and the attribute is changed. In this manner, the methods and systems allow the user to change job attributes simply using the mobile device or without accessing the multi-function device. Consequently, the methods and systems allow users to handle their jobs in an efficient, effective and easier way and also offer greater user experience, increase the convenience and flexibility for the users.

The present disclosure offers a solution to assists users to handle their jobs including (i) submitted, (ii) processing/progressing jobs and (iii) queued jobs. For simplicity, the present disclosure will be discussed with respect to a print job without limiting the scope of the disclosure.

Exemplary Environment

FIG. 1A illustrates a real physical multi-function device 101 and a mobile device 103, which is communicatively coupled to the multifunction device 101 through a call connection. The multi-function device 101 prints a job as submitted by a user. In addition to printing, the multi-function device 101 may include functionalities such as scanning, faxing, copying, imaging or the like. As shown, the multi-function device 101 is coupled to the mobile device 103, but the multi-function device 101 may be communicatively coupled to other devices such as a LDAP server, a printing server, or other multi-function devices via a network as discussed in FIG. 1B. In place of the multi-function device 101, the disclosure may include a printing device, a multi-function peripheral device, a multi-function printer and so on. The multi-function device 101 is used for printing documents as received from multiple users. The documents can be of any size.

In context of the present disclosure, the multi-function device 101 sends voice-based job-related instructions to a user at his mobile device such as 103 and the disclosure further allows the user to provide his inputs through the mobile device 103. More details are discussed below and in conjunction with other figures.

In operation, the multi-function device 101 receives a job such as a print job submitted by the user through one or more ways. For example, the job can be submitted via a print driver, via a gateway, through a memory of the multi-function device 101 and so on. The job includes one or more attributes required for printing such as a number of copies, an output tray, a finishing option, a multi-function device for printing such as multi-function device 101. Once the job is submitted by the user, the user calls the multi-function device 101 through his mobile device such as 103. The multi-function device 101 receives the call through the mobile device 103 of the user and a communication is established between the mobile device 103 and the multi-function device 101 via call. Upon receiving the call, the multi-function device 101 checks whether the mobile device 103 and/or the user is registered. The check can be performed by contacting an additional server such as an LDAP server. Once confirmed, the multi-function device 101 fetches the job of the user and checks the status of the job. For example, the multi-function device 101 checks whether the job is a completed job, a progressing job, a submitted job, a queued job and so on.

The multi-function device 101 sends one or more voice-based instructions to the user at the mobile device 103. The voice-based instructions relate to status of the job for example, the job is a queued job. Specifically, the multi-function device 101 sends one or more voice-based instructions to the mobile device 103, the one or more voice-based instructions relate to changing one or more attributes related to the job. The user submits his input key through the mobile device 103 to change the one or more attributes of the job. Based on the user received input key, the multi-function device 101 changes the one or more attributes of the job at the multi-function device 101, without requiring the user to be present at the multi-function device 101. After changing the attributes, the multi-function device 101 executes the job in accordance with the changed attributes and remaining original attributes. Finally, the multi-function device 101 prints the job in accordance with the changed attributes and remaining original/submitted attributes.

As an example, the one or more voice-based instructions may be "Do you wish to change the existing print setting feature, then please press #1;" "Do you wish to transfer the job to another multi-function device due to an error condition, then please press #2." Based on the one or more voice-based instructions, the user provides input through the mobile device 103. If the user presses #1, then the multi-function device 101 further sends one or more voice-based instructions to the user related to print setting feature. For example, the further one or more voice-based instructions may be "Do you wish to change the number of copies, please press #3;" "Do you wish to change the black color to color print, then please press #4," and so on. The user submits the input through the mobile device 103. It can be considered that the user presses #4 through the mobile device 103, the multi-function device 101 proceeds accordingly. Based on the user input key, the multi-function device 101 changes the attribute from black and white print to color print at the multi-function device 101 and then prints the job in accordance with the changed attribute and remaining original attributes. In this case, the multi-function device 101 outputs a colored print of the submitted document.

Continuing with the example, if the user presses #2, the multi-function device 101 transfers the job to another nearby multi-function device for execution. The multi-function device 101 is communicatively coupled to another multi-function device via a network (although not shown). The multi-function device 101 transfers the job along with all job attributes to another multi-function device for execution. Post receiving, another multi-function device executes the job in accordance with the submitted attributes.

In this manner, the present disclosure allows the user to change at least one job attribute through the mobile device 103 based on the one or more voice-based instructions. It must be noted that the format of the voice-based instructions discussed above is exemplary in nature and the multi-function device 101 can be programmed or designed in any manner to send the one or more voice-based instructions.

Figure 1B:
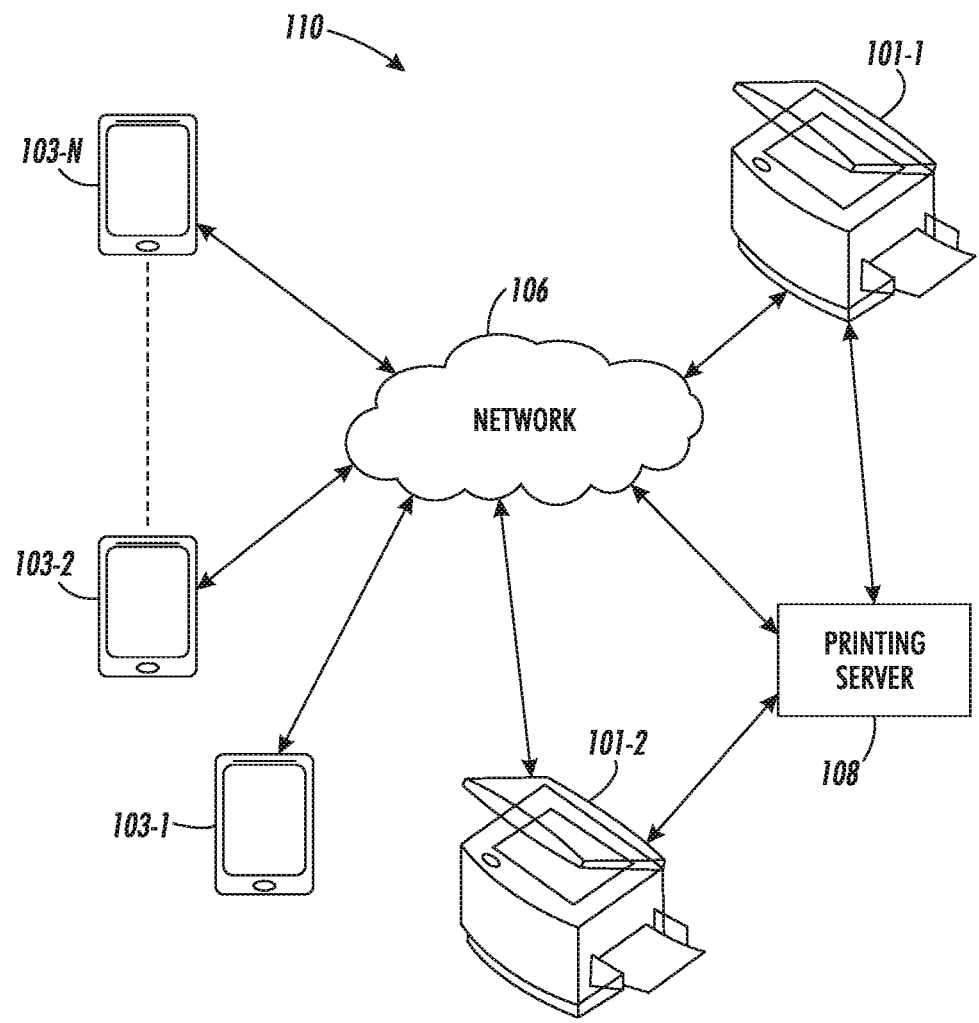
FIG. 1B shows an exemplary network environment and FIG. 1C shows an exemplary working environment in which a multi-function device is connected to a mobile device and in which various embodiments of the disclosure can be practiced.

FIG. 1B illustrates, as an example, a network environment 110 for printing of electronic documents, according to an example of the present subject matter. The environment 110 includes a plurality of multi-function devices out of which two multi-function devices 101-1 and 101-2 are shown for the sake of simplicity. The two multi-function devices 101-1 and 101-2 are hereinafter collectively referred to as multi-function devices 101 and individually as multi-function device 101. In some embodiments, the environment 110 includes multiple multi-function devices connected to each to other via the network 106.

The multi-function devices 101 may include software, hardware, firmware, or combination thereof. The multi-function devices 101 may be similar in software and/or hardware configuration. For example, all multi-function devices 101 may support finishing options and may include multiple output trays. In other examples, the multi-function devices 101 may have different software and/or hardware configuration. For instance, a multi-function device 101-1 may support a finishing option, while another multi-function device 101-2 may not support the finishing option.

The network environment 110 includes a plurality of mobile devices 103-1, 103-2, 103-N, hereinafter collectively referred to as mobile devices 103 and individually as mobile device 103. Examples of mobile device 103 may include but are not limited to, personal digital assistants (PDAs), smartphones, and other smart handheld devices. The mobile device 103 may be a braille-based mobile device.

In an example, the multi-function devices 101 and the mobile devices 103 are connected directly over the network 106 or through a printing server 108 over the network 106. In an example, the printing server 108 may be a printing server, a network server, a web server, or a data server. The network 106 may be a single network or a combination of multiple networks. The network 106 may include one or more area networks, such as a local area network (LAN), a wide area network (WAN), an intranet, the internet, or any other type of network. In an example, the network 106 may include a mobile communication network, for example, 2G, 3G or 4G mobile communication network.

In the environment 110, the user submits the job to the printing server 108. The printing server 108 controls all multi-function devices 101-1 and 101-2 coupled to the printing server 108. In such cases, the user can call any multi-function device such as 101-1 or 101-2 as his user details and mobile number are registered with the LDAP server. Upon establishing the call connection with the multi-function device say 101-1, the job is transferred to the multi-function device 101-1. The multi-function device 101-1 detects the availability of the job in the printing server 108. And the multi-function device 101-1 transfers or fetches the job from the printing server 108 to its job queue. Once fetched, the job is processed as discussed in FIG. 1A. In cases when the multi-function device such as 101-1 is not connected to the printing server 108, the user submits the job directly to the multi-function device 101-1 and the multi-function device 101-1 fetches the job from the memory of the multi-function device 101-1. And The job is processed in accordance with the description of FIG. 1A and remaining figures.

Figure 1C:
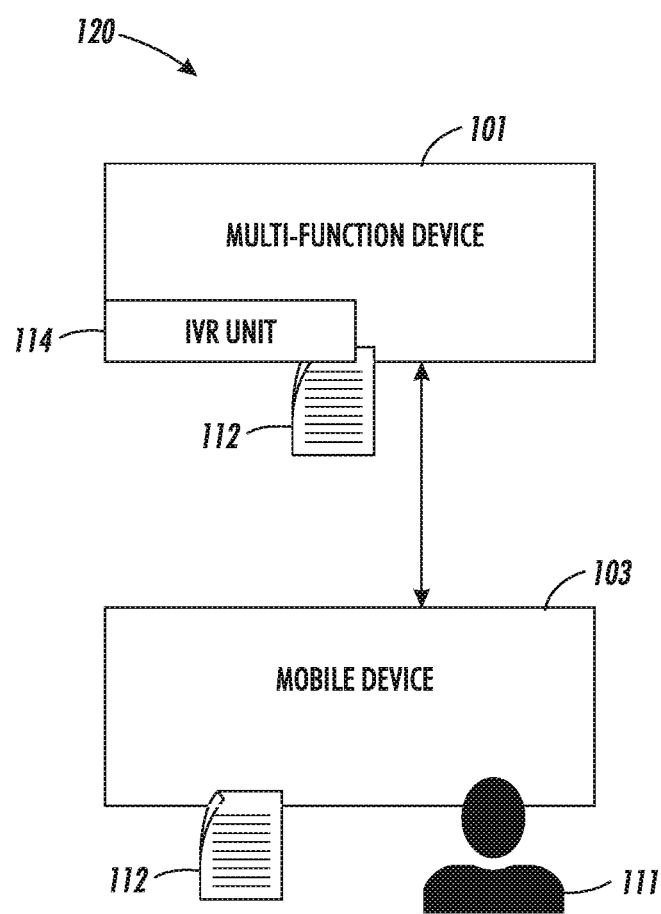

FIG. 1C shows an exemplary environment 120 in which various embodiments of the present disclosure can be practiced. The environment 120 includes a mobile device 103, and a multi-function device 101, a user 111, a document 112, an interactive voice response (IVR) unit 114.

In an exemplary implementation, the user 111 uses the mobile device 103 for his day-to-day use such as calling, messaging, Internet surfing, submitting documents for printing, and so on. The mobile device 103 may include a braille keypad which allows the user 111 to submit documents 112 for printing, send messages, and other tasks. The mobile device 103 may be a smartphone having a feature that allows the user 111 to use the mobile device 103 for various purposes. In the context of the current disclosure, the user 111 uses the mobile device 102 for performing tasks related to his print job such as inputting a key for changing one or more attributes of the job, etc. In some embodiments, the user 111 may have two separate devices such as a computing device (although not shown) and the mobile device 103. The computing device can be used for submitting documents for printing, or other tasks, while the mobile device 103 can be used for communicating with the multi-function device 101 and for providing input in the form of an input key to the multi-function device 101. The document 112 represents any document which the user 111 submits for printing. Various examples of document 112 include a textbook, a research document, a project document, thesis, a journal, a report, a user guide, and so forth. The document 112 may be any sized document having multiple pages. For example, the document 112 is of A4 size. However, the document 112 may be of sizes such as A2, A3, A5, and others without limiting the scope of the disclosure. The document 112 may be any MS office document such as a word document, ppt, excel, etc., a PDF document, a page description language (PDL) document such as PostScript (PS), Portable Document Format (PDF) and Extensible Markup Language (XML) Paper Specification (XPS).

The multi-function device 101 receives the document 112 for printing directly from the user as submitted through the computing device or the mobile device 103. In some implementations, the multi-function device 101 fetches the document 112 from the printing server such as 108 when the user submits the document 112 to the printing server 108. Upon receiving, the multi-function device 101 adds the received document 112 as a print job in a print queue of the multi-function device 101.

The multi-function device 101 includes a communication unit for communicating with remote devices such as the mobile device 103. The multi-function device 101 is associated with a unique identity number, i.e., a unique phone number. The unique phone number identifies the multi-function device 101 and is of a pre-defined format. The unique phone number facilitates communication between the multi-function device 101 and the mobile device 103 and other devices. Similarly, the mobile device 103 is associated with a unique identity number, i.e., a unique mobile number. The unique mobile number identifies the mobile device 103 and is of a pre-defined format. The unique mobile number facilitates communication between the mobile device 103 with the multi-function device 101 and other devices. The user 111 uses the multi-function device 101 for his/her day-to-day tasks such as printing, copying, faxing, and so on. In the context of the current disclosure, the multi-function device 101 receives a call from the mobile device 103 and checks whether the mobile device 103 is registered with an LDAP server coupled to the multi-function device 101 based on the mobile number and user details available with the multi-function device 101. After checking, the multi-function device 101 establishes a communication with the printing server 108 to determine whether a job is submitted by the user at the printing server 108. Once the connection is established and an affirmative determination is made, the job is fetched at the multi-function device 101. Then, the status of the job of the user is checked by the multi-function device 101. Then, the IVR unit 114 is automatically activated by the multi-function device 101. The multi-function device 101 starts transmitting voice-based instructions to the mobile device 103 of the user 111, to change at least one job attribute. As shown in FIG. 1C, the IVR unit 114 is a part of the multi-function device 101. But in some embodiments, the IVR unit 114 may be external to the multi-function device 101 without deviating from the scope of the present disclosure.

Initially, the user 111 registers his mobile device 103 with the multi-function device 101 and the registration is a one-time process. For registration, the user submits user details and mobile number of the mobile device 103. Upon successful registration, the user 111 submits the document 112 for printing which is received by the multi-function device 101 or by the printing server 108. After submitting the job, the user 111 dials multi-function device 101 phone number through the mobile device 103. When the multi-function device 101 receives the call from the registered mobile device 103, the multi-function device 101 automatically checks for the user's job. If the multi-function device 101 finds any job of the user 111 in the job queue/history, then the multi-function device 101 automatically activates the interactive voice response (IVR) unit 114 over the call. The IVR unit 114 sends voice-based instructions to the user changing at least one job attribute. The voice-based instructions are transmitted to the mobile device 103. Based on the voice-based instructions, the user 111 submits input by pressing the required key through the mobile device 103. Based on the input, the multi-function device 101 changes the at least one submitted attribute related to the job at the multi-function device in real-time. Finally, the multi-function device 101 prints the job in accordance with the at least one changed attribute and remaining submitted attributes.

Figure 2A:
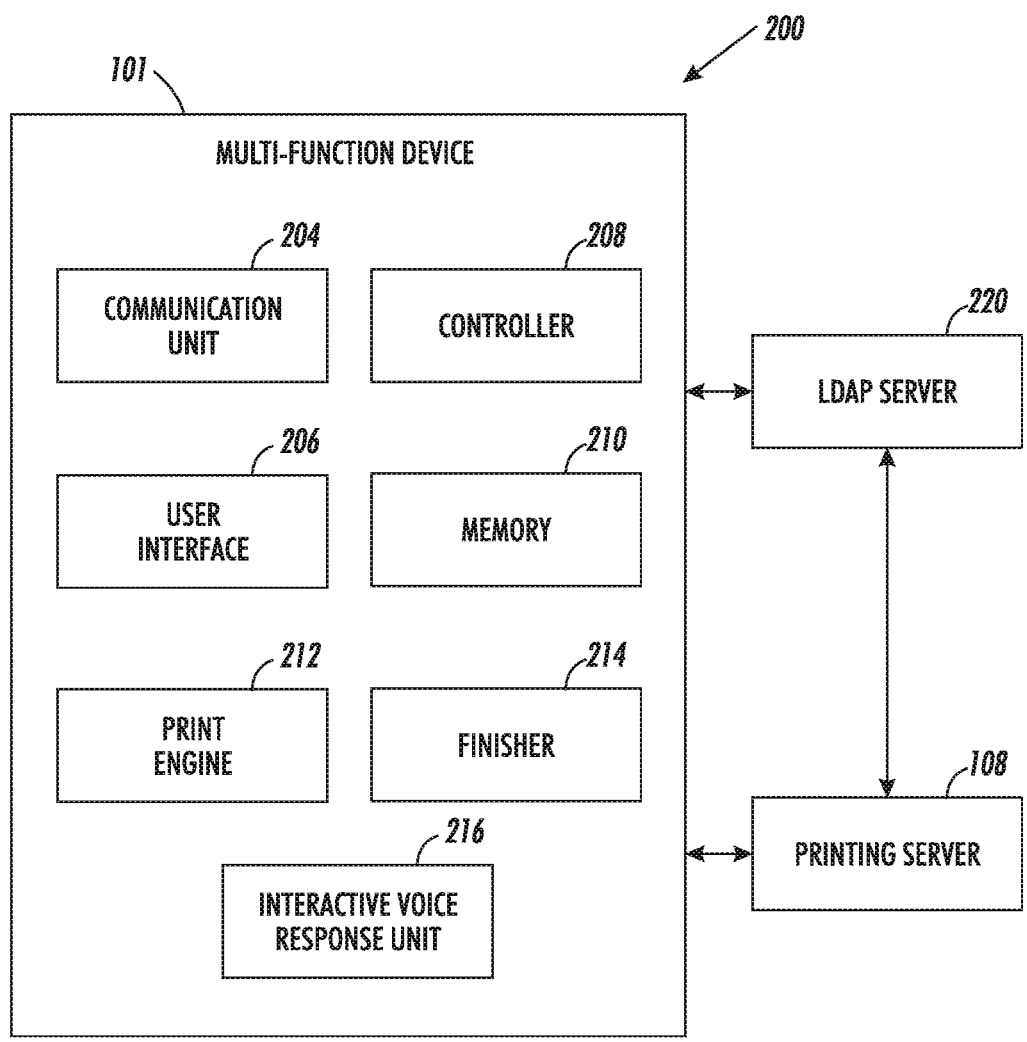

FIG. 2A shows a block diagram of an overall system 200 for assisting users through voice-based instructions. As shown, the system 200 includes a multi-function device 101 communicatively coupled to an LDAP server 220 and the printing server 108 via a suitable network as discussed above. The multi-function device 101 includes a communication unit 204, a user interface 206, a controller 208, a memory 210, a print engine 212, a finisher 214, and an Interactive Voice Response (IVR) unit 216. Each of the components 204, 206, 208, 210, 212, 214 and 216 are coupled to each other via a communication bus or later developed protocols and each of the components 204-216 communicate with each other for assisting users through voice-based instructions. The multi-function device 101 may include one or more additional components as required to implement the current disclosure.

Firstly, before using the multi-function device 101 and its services, a user registers his details with the multi-function device 101. The registered details are stored with the LDAP server 220 and the multi-function device 101. While registering, the user provides his details such as username, passcode or other details to identify the user and his job. In the context of the current disclosure, the user registers his mobile number with the multi-function device 101. All details of the user are mapped with his mobile number in the LDAP server 220. In some embodiments, the user can register with the help of an admin via Internet Services such as CentreWare Internet Services (CWIS) of the multi-function device 101.

The multi-function device 101 receives a job submitted by the user using his mobile device/print driver or Internet Services or the printing server 108. The job is listed in a print queue of the multi-function device 101. The job may be a secure job or a normal job. Each time when the user submits the job, the user initiates an interaction with the multi-function device 101 using his registered mobile device. The user places a call to the multi-function device 101 through his registered mobile number. The user dials the phone number of the multi-function device 101 through his registered mobile number of the mobile device 103.

As shown, the communication unit 204 includes a receiver and a transmitter (although not shown). The communication unit 204 receives a call from the mobile device 103. The communication unit 204 can be in the form of a telephone line facilitating landline phone capability. In other examples, the communication unit 204 can be in the form of a wireless line facilitating wireless phone capability. The communication unit 204 can include any electronic components for enabling landline/telephone or mobile communication. Upon receiving the call, the communication unit 204 establishes a call connection between the multi-function device 101 and the mobile device 103 through the communication unit 204. Further, one or more voice-based instructions are transmitted to the mobile device 103 over the communication unit 204 and input keys are received through the communication unit 204. The communication unit 204 may include a receiver for receiving and a transmitter for transmitting purpose.

Once the call connectivity is established with the multi-function device 101, then the controller 208 is triggered. The controller 208 contacts the LDAP server 220 for authenticating the mobile device and/or the user.

The LDAP server 220 is a server that facilitates authentication and security services. More specifically, the LDAP server 220 stores user details such as user name, user id, passcode, mobile number and other relevant user details. In the context of the disclosure, the LDAP server 220 performs authentication based on the mobile number of the user. The LDAP server 220 verifies whether the call received through the mobile device 103 is a registered mobile device or a registered user with the LDAP server 220. The LDAP server 220 checks the mobile number associated with the device in the LDAP server 220. In case the mobile number is found in the LDAP server 220 then the mobile device is authenticated. In this manner, the LDAP server 220 authenticates and authorizes the user to use the multi-function device 101 and its services. Once authenticated, the LDAP server 220 retrieves the user id or user name based on the mobile number. In addition to authenticating the mobile device of the user, the LDAP server 220 stores details about access and printing rights. For example, a mobile device may be allowed to utilize a corresponding to set of printing features (and other features), as indicated by the data maintained by the LDAP server 220. The LDAP server 220 determines access control, the access control may be determined based on, for example, a mobile number, a username, a group (or department) name, a device name, etc.

Once the LDAP server 220 authorizes the received call or authenticates the mobile device 103 of the user, the LDAP server 220 communicates the outcome to the controller 208 of the multi-function device 101. Along with the outcome, the LDAP server 220 communicates the retrieved user ID to the controller 208.

The controller 208 receives the outcome and the user ID from the LDAP server 220. If the user is not authorized successfully by the LDAP server 220, the controller 208 stops the execution. If the user is authorized successfully by the LDAP server 220, the controller 208 proceeds further. Based on the received user id, the controller 208 identifies the job corresponding to the user. The controller 208 checks a job queue and/or a job history to identify the job of the user. The controller 208 then checks the status of the job and passes the status of the job to the IVR unit 216. The controller 208 automatically activates the IVR unit 216 over the established call to interact with the user through voice-based instructions, for further processing. The controller 208 provides all instructions to the IVR unit 216.

Once activated, the IVR unit 216 transmits all instructions to the user in the form of one or more voice-based instructions related to the job.

In context of the current disclosure, the IVR unit 216 sends one or more voice-based instructions to change at least one submitted attribute relating to the job. The one or more voice-based instructions are sent to the mobile device over the established call. In one example, changing the at least one submitted attribute includes changing the least one print setting feature. The at least one print setting feature includes at least one of a number of copies, an output tray, a finishing option, a two-sided printing option, a color or black-white option, and a job stapling option. In another example, changing the at least one submitted attribute includes changing the multi-function device 101, i.e., transferring the submitted job to another multi-function device. The submitted job is transferred to another multi-function device when at least one of condition occurs when an error occurs at the multi-function device 101, when one or more resources for executing the job are finished at the multi-function device 101 and when one or more resources are unavailable at the multi-function device 101. Various examples of error may be any internal faults, say, system error, unclearable jams, and so forth.

Based on the one or more voice-based instructions, an input key is submitted through the mobile device to change the at least one submitted attribute related to the job. The IVR unit 216 receives the input key submitted by the user and passes the input key to the controller 208. The controller 208 changes the at least one submitted attribute related to the job at the multi-function device 101 in real-time. The controller 208 overwrites the at least one submitted attribute related to the job in real-time at the multi-function device 101. The controller 208 coordinates with the print engine 212 for printing. The print engine 212 prints the job in accordance with the at least one changed attribute and remaining submitted/original attributes. If the user submits the input key corresponding to changing the print setting feature, then the print job is printed in accordance with that. If the user submits the input key to transfer the job to another multi-function device, then the job is transferred to another multi-function and the job is printed at another multi-function device. The controller 208 puts the job on hold based on the input key from the user to change the at least one submitted attribute.

In some implementations, when at least one condition occurs, the IVR unit 216 sends one or more voice-based instructions to place a call to an admin user. The IVR unit 216 automatically initiates a call to a mobile device of an admin user. Similar to the user, a mobile number associated with the mobile device is registered with the LDAP server 220. The LDAP server 220 registers the mobile number of the admin user. The IVR unit 216 sends one or more voice-based instructions to the mobile device of the admin user to check for the at least one condition and fix the at least one condition. The admin user receives the one or more voice-based instructions and proceeds further to check the at least one condition. In case of an error, multi-function device 101 checks for the error and fixes the error. In case the resources are finished, the admin user refills the required resources. In case the resources are unavailable, the admin user arranges for the unavailable resources and fixes the condition.

Once the condition is fixed, the controller 208 automatically re-activates the interactive voice response (IVR) unit 216 for the user to resume the job. The IVR unit 216 initiates transmitting one or more voice-based instructions such as status of the job, releasing the job and other relevant details.

In some implementations when at least one condition occurs, the IVR unit 216 sends one or more voice-based instructions to pause the job and continue the job later. Based on the input key from the user, the job is put on hold. Once the at least one condition is fixed, the IVR unit 216 calls back the original job owner (the user) to resume the job and follows the IVR options selected by the user.

Continuing with FIG. 2A, the print engine 212 prints the job/document received from the user. In some cases, the printed documents are further passed to the finisher unit 214 for finishing purposes. The finisher 214 includes one or more units for finishing the received jobs for the user. The finisher 214 receives the completed pages from the print engine 212 and provides a finished product. Few examples of the finisher 214 include a staple, a stacker, catch tray a binder, an inserter, other output device and so on. For example, if an inserter is required for the print job, then the number of required sheets and other pertinent information is shown.

The user interface 206 displays a print queue listing all jobs under progress and further displays a job history listing jobs that are completed. The user interface 206 displays the processing and progress of all jobs at the time of execution. The memory 210 stores profile of the user. The profile includes the user credentials, his preferences and other details required for implementing the present disclosure. The memory 210 further stores all details associated with the received job. The details are deleted when the job is completed successfully. The job details are saved directly in the hard drive of the multi-function device 101.

Although the IVR unit 216 is shown as a part of the multi-function device 101 in FIG. 2A, the IVR unit 216 can be incorporated as a separate module/component and can communicate with the multi-function device 101 in various ways.

The present disclosure can be implemented in multiple ways. For example, the present disclosure can be implemented when there is a single multi-function device. In all such cases, the multi-function device 101 performs the functionalities for assisting users through voice-based job instructions. In another example, the disclosure can be implemented as combination of the multi-function device 101 and a server (although not shown). In such cases the server performs all the functionalities for assisting users through voice-based job instructions. The server interacts with the multi-function device 101 to assist the user on their print jobs. And the server incorporates the IVR unit 216 and performs all the functionalities as discussed above. The server discussed here may be the printing server 108 or may be a server different than the printing server 108 without, limiting the scope of disclosure.

Figure 2B:
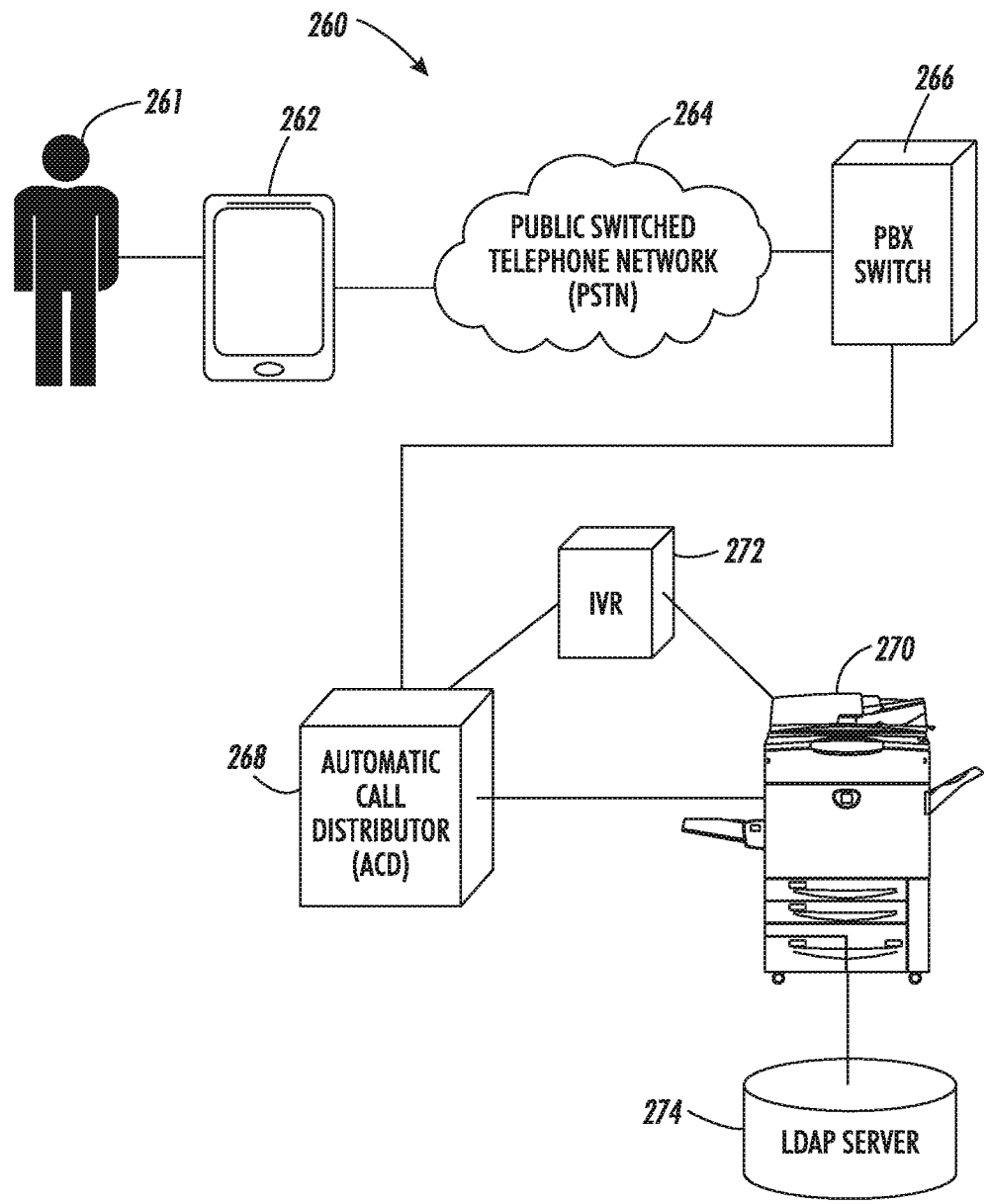
FIG. 2B is a flow diagram illustrating the interaction between various components of the system.

FIG. 2B shows a block diagram 260 illustrating interaction between various components according to an embodiment of the disclosure. It is understood that the components shown here are exemplary and may vary based on the requirement and/or implementation. The flow diagram 260 includes a user 261, a mobile device 262, a public switched telephone network (PSTN) 264, a PBX switch 266, an automatic call distributor (ACD) 268, a multi-function device 270, an interactive voice response (IVR) unit 272 and a Lightweight Directory Access Protocol (LDAP) server 274. The block diagram 260 shows the components involved when the user 261 places a call through his mobile deice 262. As shown, the user 261 carries the mobile device 262 which is connected to the PSTN 264 which is further communicatively coupled to the PBX switch 266, which is connected to the ACD 268, which is coupled to the multi-function device 270. The multi-function device 270 is communicatively coupled to the IVR unit 272 and the LDAP server 274.

The user 261, for example, may be a visually impaired user who faces challenges while handling jobs after submission. For example, the user 261 may face challenge while tracking the job, collecting the job and so on. The user 261 may be a partially visually impaired user/partially sighted, the user may be a sighted user or may be a disabled user. The mobile device 262 is used by the user 261 for his day-to-day tasks. The mobile device 262 may be a braille-based device in case the user 261 is a visually impaired or a partially visually impaired user. The mobile device 262 may be a smart phone, where a mode for disabled users is provided. The mobile device 262 is used for communicating with the multi-function device 270 over voice calls.

The Public Switched Telephone Network (PSTN) 264 is a telecommunication network that allows users at different sites to communicate by voice. The PBX 266 is a telephone system with an enterprise that switches calls between an enterprise user for example, the user on local lines while allowing all users to share a certain number of external phone lines. The ACD 268 is a telephony device that answers and distributes incoming call to a specific group of terminals or agents with the enterprise such as the multi-function device 270.

The multi-function device 270 provides the functionalities of printing, scanning, copying, faxing or a combination thereof. The multi-function device 270 includes, for example, a telephone line through which calls are received from external devices such as the mobile device 262. Upon receiving the call, the multi-function device 270 validates a mobile number associated with the mobile device 262 with the help of the LDAP server 274 as discussed. The LDAP server 274 stores all user details including his user name, user id, passcode, password, mobile number, mapping of the user details with the mobile number and so on. For example, the LDAP server stores mapping of the passcode and the mobile number associated with the mobile device 261. The details stored with the LDAP server 274 are used for authenticating the user/mobile device when a call is received from the mobile device 262. Upon validation, the IVR unit 272 is automatically activated. The IVR unit 272 sends one or more voice-based instructions to the mobile device of the user 261. The voice-based instructions provide information about the print job as well as allows the user 261 to release the print job, without requiring him to be present at the multi-function device. The voice-based instructions related to changing at least one job attribute. The voice-based instructions relate to his jobs present in a job queue.

Exemplary Flowcharts

The method flowcharts provide a solution for users on how to easily and securely handle one or more jobs submitted for printing. The methods propose the use of a mobile device of a user that the user typically carries all the time in office premises and otherwise. The mobile device is used for providing an input key and/or for receiving one or more voice-based job-related instructions/notifications. To be able to use the mobile device, the user requires registration of a mobile number associated with the mobile device. Post registering the mobile number, the solution allows the user to securely change one or more job attributes using his mobile device.

Registration

Figure 3:
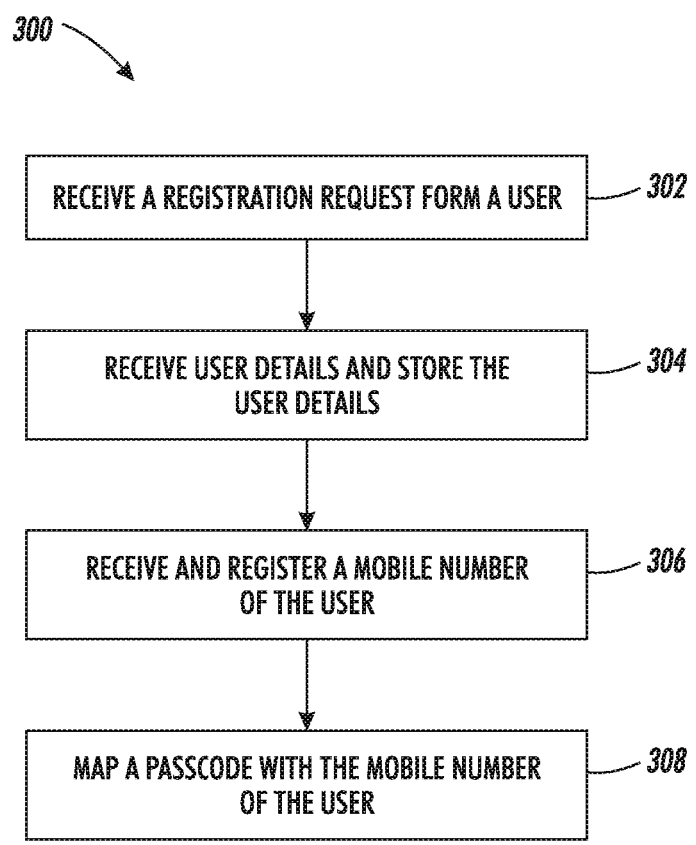
FIG. 3 illustrates a method flowchart for registering users with the multi-function device.

FIG. 3 is a flowchart 300 for registering a user with a multi-function device and/or with an LDAP server. The user is registered for using the multi-function device and its services. Specifically, a mobile number associated with a mobile device of the user is registered with the multi-function device for receiving voice-based instructions related to his one or more jobs. The jobs are print jobs as an example. Specifically, the user registers his mobile number and other user details with LDAP server, which is communicatively coupled to the multi-function device. The registration is a onetime process. The user, for example, a visually impaired user's details along with his mobile number are registered to multi-function device LDAP server. When the user calls the multi-function device, the MFD (using LDAP) easily authorizes the user by comparing the unique mobile number. The voice-based instructions help the user easily track the jobs in an efficient and effective manner. In case of a visually impaired user, the user may take help from an admin user or other users for registration. The method 300 is described with respect to the multi-function device where various blocks are implemented by the multi-function device with inputs from the user wherever necessary.

The method begins with when a user registers for using multi-function device and its services. At 302, a request for registration is received from the user. Upon receiving the request, the multi-function device requests the user to provide his details including a user id, a user name, a passcode or other details of the user. Then, the user provides the requested details including a user name, a user id, a passcode, and so on. The multi-function device receives the user details and stores the received details in a server such as an LDAP server, LDAP database, for later retrieval and use. At 304, the user details are received and stored in a database or a server such as an LDAP server, an LDAP database, and so on. Upon receiving the details, the multi-function device requests the user to provide his mobile number, which he wishes to use for using printing services at the multi-function device such as for checking status of the job, changing one or more job attributes. The user provides his mobile number. Upon receiving, the multi-function device verifies the mobile number of the user using known techniques or later developed protocols. For example, the multi-function device may request the user to verify his mobile number using a One Time Password (OTP) approach.

At 306, the mobile number of the user is received and is further registered with the multi-function device. Similar to the user details, the mobile number is stored with the LDAP server. The mobile number is used for identifying the user or authenticating the user. Further, the mobile number is used for providing inputs related to the jobs, for example, providing passcode for releasing the job, pressing keys for releasing the job and so on.

At 308, the passcode is mapped with the mobile number associated with the mobile device of the user. Other user details are also mapped with the mobile number of the user. The mapping of the user details and the mobile number is stored in the LDAP server. The details are retrieved for authentication or for identification when a call is received from the user. The received mobile number of the user is mapped with the user details such as a user name, a user id, or a passcode for identifying the user. These are just a few examples, the mobile number of the user may be mapped with other details of the user. The mapping is stored in the LDAP server. In this manner, the mobile number of the user is registered with the multi-function device or LDAP server for later retrieval and use. Once registered, the mobile number is ready for use such as for example, receiving calls from the multi-function device or making calls to the multi-function device.

In some aspects, the user may change the mobile number. In such cases, the user may have to perform the complete registration process again and register the new mobile number of his choice.

Similar to the user, the admin user may also register his respective mobile number with the multi-function device or with the LDAP server. The admin user may submit his mobile number at the multi-function device or at the LDAP server. The mobile number of the admin user may be verified and is finally registered. Once registered, the mobile number is ready for use such as for example, receiving calls from the multi-function device or making calls to the multi-function device. More details on the usage of the mobile device will be discussed below in greater detail.

Voice-Based Assistance (Fetching Job from a Printing Server)

Figure 4:
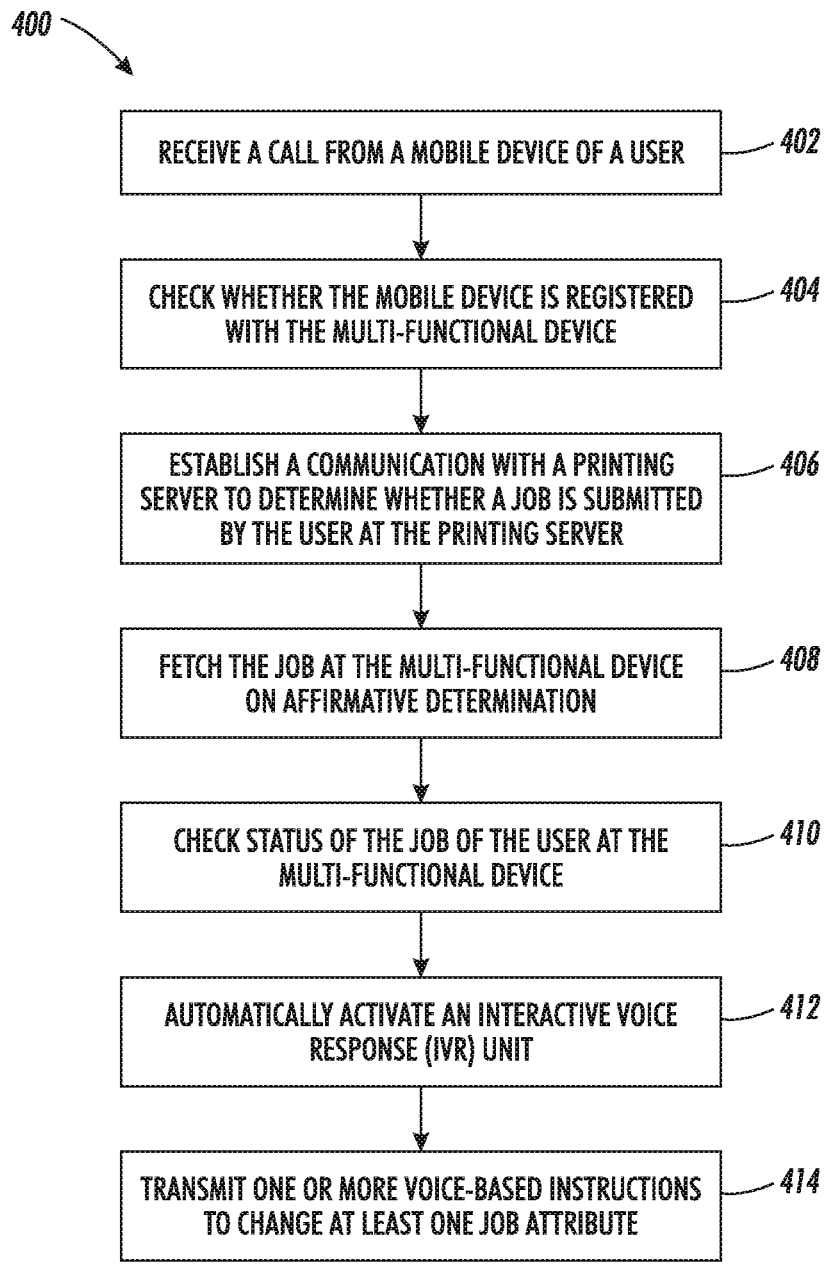
FIGS. 4-7 illustrate method flowcharts for assisting users via voice-based instructions related to print jobs.

FIG. 4 is a method flowchart 400 for assisting users through voice-based instructions. The method is specific to fetching a job from a printing server. The job may be a submitted job, a queued job, a progressing job, and a completed job. The printing server is a server communicatively connected to one or more multi-function devices. The printing server controls all functionalities of the multi-function devices and the multi-function device prints the job as instructed by the printing server. The method may be implemented by the printing server and/or a multi-function device. The printing server or the multi-function device may contact an LDAP server as required. For example, the printing server may contact LDAP server for authenticating the user. In another example, the multi-function device may contact the printing server for fetching the job from the server. It is considered that the user is already registered with the multi-function device or with the LDAP server, as discussed in conjunction with FIG. 3.

According to the flowchart, the user submits the job at the printing server.

Initially, a job from a user is received at the printing server for printing at one of the multi-function devices coupled to the printing server. To know more about the submitted job, the user need not go to the multi-function device but directly initiates communication with the multi-function device through his mobile device. The user dials the telephone number of the multi-function device through his mobile device.

Upon submitting the job at the printing server, the user calls a multi-function device. At 402, a call from the mobile device of the user is received.

Upon receiving the call, the mobile number associated with the mobile device is identified. It is checked whether the mobile number is registered with the multi-function device. At 404, the multi-function device may contact the LDAP server to check whether the mobile device is a registered or the user associated with the mobile device is a registered user. The multi-function device may send the mobile number to the LDAP server for authentication and verification purpose. Based on the received mobile number, the LDAP server checks the mobile number with the stored data. If the mobile number is identified, the user/mobile device is successfully authenticated. The LDAP server retrieves the corresponding user ID and communicates back to the multi-function device and the method 400 proceeds further. If the mobile number is not identified, the user is not successfully authenticated, and the method stops.

At 406, the multi-function device establishes a communication with the printing server to determine whether a job is submitted by the user at the printing server.

At 408, the job is fetched at the multi-function device on the affirmative determination of the submission of the job by the identified user. This fetching facilitates the user to trigger a job to any specific printing server and able to get their output from their desired multi-function device. This provides much greater mobility to the user.

At 410, the status of the fetched job of the user is checked at the multi-function device. The status of the job may be a completed job, a progressing job, and a queued job.

At 412, an interactive voice response (IVR) unit is activated automatically. Upon activation, the IVR unit starts transmitting one or more voice-based instructions to the user. At 414, one or more voice-based instructions are transmitted to change at least one job attribute.

The one or more voice-based instructions may relate to at least one of a voice-based instruction to inform current status of the job a voice-based instruction to prompt the user to enter an input for changing printing attributes of the job; a voice-based instruction to prompt the user to transfer the job to another multi-function device when the multi-function device internally diagnoses that the job cannot be completed at the multi-function device; a voice-based instruction to prompt the user to transfer the job to another MFD when one or more resources for executing the job are finished, a voice-based instruction to prompt the user to pause the job, a voice-based instruction to call an admin user and so on. More details on each of these will be discussed in conjunction with the below flowcharts.

Other one or more voice-based instructions may include, but not limited to, job details including creation time, user name, document name, paper size, and number of pages; position of the job in a job queue; estimated time of completion of the job; resources available with the MFD for processing of the job; one or more voice-based instructions to promote the job to first position in the job queue; and a voice-based instruction to prompt the user to enter an input for releasing the job.

Changing Attributes

Figure 5:
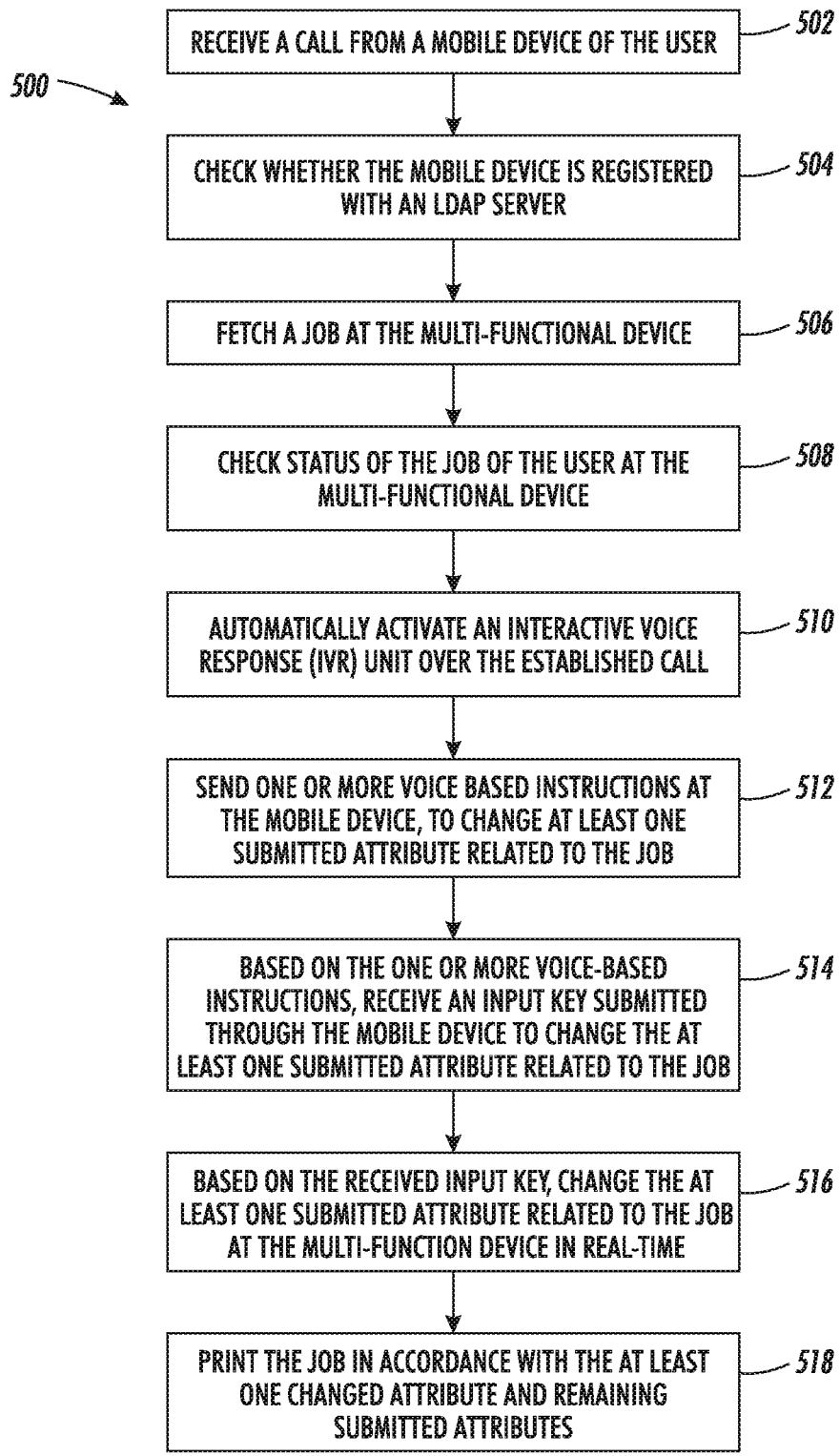

FIG. 5 is a method flowchart 500 for assisting users through voice-based instructions. The voice-based instructions bring in options like changing one or more job attributes. Examples of changing attributes include changing print setting feature and changing a multi-function device for executing the job due to one or more scenarios and so on. The method 500 covers both scenarios where a user wishes to change any print setting feature, or the user wishes to change the multi-function device. It is considered that the user is already registered with the multi-function device as discussed in conjunction with FIG. 3 to receive voice-based instructions from the IVR unit of the multi-function device. The multi-function device may be coupled to a Light Weight Directory Access Protocol (LDAP) server or the multi-function device may have the functionality of LDAP server.

Initially, the method begins with when the user submits a job for printing. The job includes one or more attributes. Various examples of the attributes include print settings such as a number of copies, two-sided or single-sided printing option, an output tray, monochrome print or color print, finishing options, a multi-function device for printing the job, and so on. At the time of submitting the print job, user details such as user id, user name, etc. are also submitted.

Post submitting the print job, the user calls the multi-function device. At 502, a call from a mobile device of the user is received, the mobile device is associated with a mobile number. Upon receiving the call, a call connection is established between the mobile device and the multi-function device. It is then checked whether the mobile device is registered with the Light Weight Directory Access Protocol (LDAP) server coupled to the multi-function device, based on the mobile number and user details available with the multi-function device/LDAP server at 504. Based on the check, a communication with a printing server is established to determine whether a job is submitted by the user at the printing server. The block is implemented when the user submits the job directly at the printing server. Based on the determination, the job is fetched at the multi-function device at 506. In case the job is submitted at the printing server, the multi-function device fetches the job from the printing server. In case the job is directly submitted at the multi-function device, the job is fetched from a memory of the multi-function device.

Then, status of the job of the user is checked at 508. For example, the status may be the job is under progress, the job is in a queue, the job is just submitted, the job is completed, and so on. In case the status of the job is completed then, the method stops. Based on the job status, an interactive voice response (IVR) unit is automatically activated over the established call to interact with the user through one or more voice-based instructions at 510. The voice-based instructions may be in the form instructions for the user to follow. Alternatively, the voice-based instructions may be in the form of notifications for the user. The IVR unit is programmed to send the one or more voice-based instructions or notifications to the user without requiring the user to be present at the multi-function device or waiting for his turn at the multi-function device. The IVR unit initiates transmitting one or more voice instructions updating the user about his current status of the job. Then, the IVR unit sends one or more voice-based instructions to change at least one submitted attribute related to the job at 512. The one or more voice-based instructions are sent to the mobile device of the user over the established call. The user receives the one or more voice-based instructions to change at the at least one submitted attribute at the mobile device of the user. The one or more voice-based instructions to change the least one submitted attribute include at least one of one or more voice-based instructions to change the at least one print setting feature and one or more voice-based instructions to transfer the job to another multi-function device. The one or more voice-based instructions to change the at least one submitted attribute related to the job is sent automatically by the multi-function device.

Here, changing the at least one submitted attribute may be changing the at least one print setting. Various examples of the print setting feature include at least one of a number of copies, an output tray, a finishing option, a two-sided printing option, a color or black-white option, and a job stapling option. In other examples, changing the at least one submitted attribute may be changing the multi-function device for executing the job, i.e., transferring the submitted job to another multi-function device. The submitted job is transferred to another multi-function device when at least one of condition occurs. In an example, the submitted job is transferred to another multi-function device when an error occurs at the multi-function device. In another example, the submitted job can be transferred to another multi-function one or more resources for executing the job are finished at the multi-function device. In further example, the submitted job can be transferred to another multi-function device when one or more resources are unavailable at the multi-function device.

The one or more voice-based instructions to change the at least one attribute may be transmitted to the user before initiating the job execution. For example, the voice-based instruction to change the at least one print setting may be sent before the job execution. In other implementations, the one or more voice-based instructions may be sent in the middle of executing the job. In cases an error occurs at the multi-function device or one or more resources are exhausted while executing the job, the one or more voice-based instructions may be transmitted when the job execution is already started but is yet to be finished.

Based on the one or more voice-based instructions, the user provides his input key through the mobile device. At 514, the input key submitted through the mobile device to change the at least one attribute related to the job, is received. The user presses a pre-defined key to change the at least one submitted attribute. For example, the multi-function device sends a voice-based instruction to the user "Do you wish to change the at least one print setting attribute? If yes, please press #1." The user presses #1 to confirm that he wishes to change the attribute. Further to this voice-based instruction, a voice-based instruction may be "if you wish to change the at least one submitted attribute, please enter an input for changing the at least one submitted attribute." For instance, "if you wish to change the number of copies from 1 to 2, then press #2." In another instance, "if you wish to change the black and white print to color print, then press #3," and so on.

In another example, a voice-based instruction may be "An internal error occurred at the multi-function device, Do you wish to transfer the job to another multi-function device, then press 0." In further example, a voice-based instruction may be "One or more resources are exhausted at the multi-function device, Do you wish to transfer the job to another multi-function device, then press #4." In further example, a voice-based instruction may be "One or more resources are exhausted at the multi-function device, Do you wish to pause the job, then press #5." In a furthermore example, a voice-based instruction may be "One or more resources are exhausted at the multi-function device, a call to admin user to fix the multi-function device, then press #6." In additional example, voice-based instruction may be "one or more resources are unavailable at the multi-function, do you wish to transfer the job to another multi-function device, then press #7."

Based on the requirement, the user can key in their desired selection, i.e., the input key and proceed further. The multi-function device receives the submitted input key submitted through the mobile device. The input key indicates the input to change the at least one submitted attribute related to the job.

Based on the received input key, the at least one submitted attribute related to the job is changed at the multi-function device in real-time at 516. Here, changing the at least one submitted attribute includes overwriting the at least one submitted attribute related to the job in real-time at the multi-function device. Based on an input key from the user, the job is put on hold to change the at least one submitted attribute.

Finally, the job is printed in accordance with the at least one changed attribute and remaining submitted attributes at 518.

Continuing with the above example, if the user presses #1, this indicates the user wishes to change at least one print setting feature. The multi-function device, specifically, the IVR unit receives the input key #1. Then, based on this input, the multi-function device further sends one or more voice-based instructions indicating which print feature he wishes to change. For example, the user presses #2. The multi-function device receives this input key #2. The multi-function device changes the attribute from 1 to 2 and prints 2 copies of the document included in the job. While printing the remaining attributes remain the same such as finishing option, monochrome print or color print and so on. In this manner, the job is printed in accordance with the changed attribute, i.e., the number of copies and other remaining attributes.

If the user presses 0, this indicates the user wishes to transfer the job to another multi-function device due to an internal error at the multi-function device. The multi-function device receives the input key. As a next step, the job is transferred to another multi-function device directly or via the printing server. Another multi-function device may be communicatively coupled to the multi-function device. While transferring the job to another multi-function device for execution, information for executing the job such as document included in the job, attributes, user id, mobile number, completion details, any preferences, etc., are submitted to another multi-function device. Another multi-function executes the job and updates the user by calling the user. Another multi-function device calls the user at his mobile device and transmits voice-based instructions providing status of the job.

In some cases, when the user wishes to transfer the job to another multi-function device, then a call is automatically initiated to a mobile device of an admin user, the mobile device is associated with a mobile number. Similarly, to the user, the mobile number of the admin user is registered with the multi-function device or the LDAP server. After initiating the call, the IVR unit sends one or more voice-based instructions to the mobile device of the admin user to diagnose the multi-function device and fix the at least one condition. The one or more voice-based instruction may be a paper jam is observed, please fix it; ink for printing the job is finished, please refill and so on. The admin user checks the at least one condition and fixes the at least one condition. Post the multi-function device is fixed, the interactive voice response (IVR) unit is automatically re-activated. The IVR unit places a call to the mobile device of the user and a call connection is established to update the user about the job resumption. The multi-function device resumes the job and finishes the job execution.

The method flowchart 500 facilitates the user to change the attributes of the submitted job simply using his mobile device and without requiring him to be present at the multi-function device. The attributes are changed at and by the multi-function device before the initiation of the job execution and/or after the initiation of the job execution. Thus, the method proposed herein takes a final approval of the printing attributes before rasterizing of the job.

The method can be implemented in the form of a non-transitory computer-readable medium comprising instructions executable by a processing resource. The processing resource receives a job submitted by a user, wherein the job comprising one or more attributes; receives a call from a mobile device of the user, the mobile device is associated with a mobile number; establishes a call connection between the mobile device and the multi-function device; checks whether the mobile device is registered with a Light Weight Directory Access Protocol (LDAP) server coupled to the multi-function device, based on the mobile number and user details available with the multi-function device; checks the status of the job of the user at the multi-function device; automatically activates an interactive voice response (IVR) unit over the established call to interact with the user through one or more voice-based instructions; sends the one or more voice-based instructions to change at least one submitted attribute related to the job; based on the one or more voice-based instructions, receives an input key submitted through the mobile device to change the at least one submitted attribute related to the job; changes the at least one submitted attribute related to the job at the multi-function device in real-time; and prints the job in accordance with the at least one changed attribute and remaining submitted attributes.

The changing the at least one submitted attribute includes changing the at least one print setting feature. The changing the at least one submitted attribute includes transferring the submitted job to another multi-function device.

Figure 6:
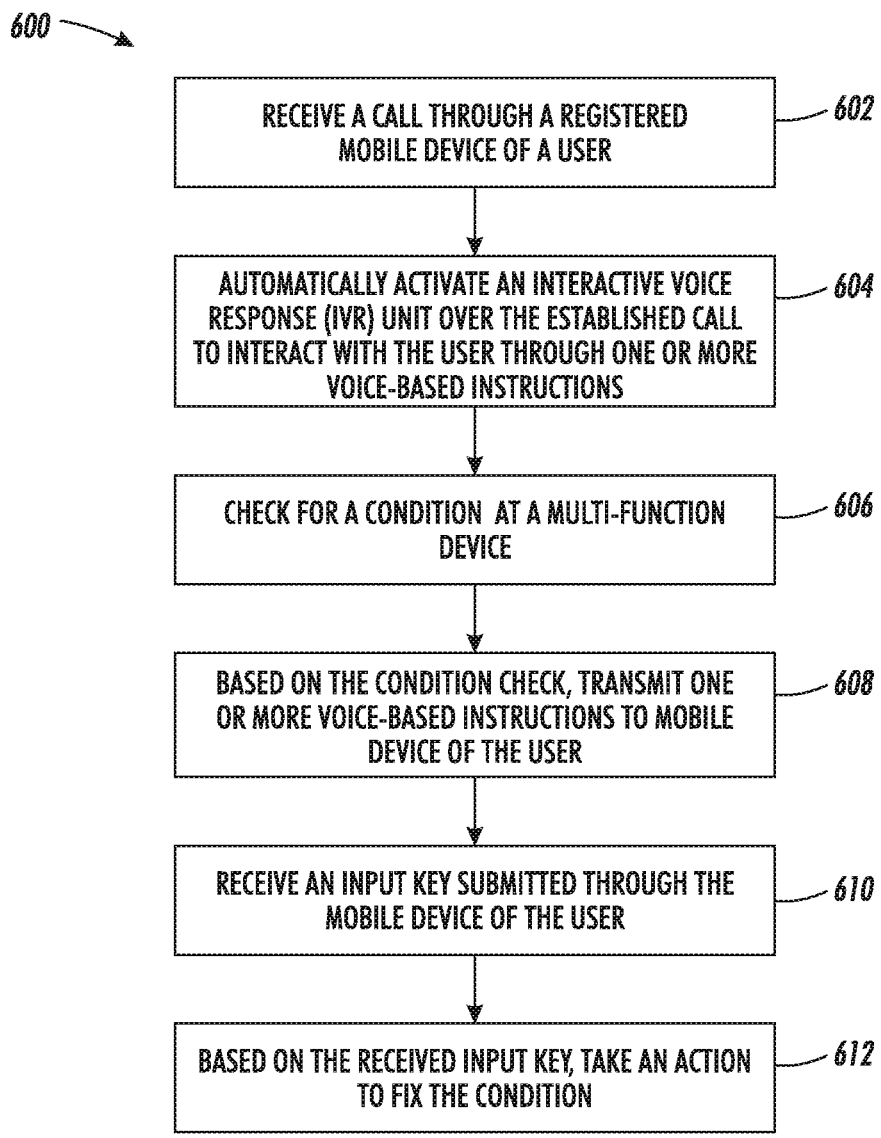

FIG. 6 is a method 600 for real-time assistance by a multi-function device (MFD) through one or more voice-based instructions. The method is specific to when a condition occurs at the multi-function device and the user wishes to transfer a job to another multi-function device. The job is transferred to another multi-function device when the multi-function device internally diagnoses that the job cannot be completed at the multi-function device due to one or more conditions. For example, there can be an error at the multi-function device such as internal faults, system error, unclearable jams, and the like. In another example, the one or more conditions can be when resources are exhausted at the multi-function or resources are unavailable at the multi-function device. In addition to transfer the job to another multi-function device, the user can pause the job until the multi-function device is fixed or a call to admin user can be initiated to fix the multi-function device.

The method begins with when the user submits the job. After submitting the job, the user calls the multi-function device through his mobile device. The mobile device of the user is already registered as discussed in conjunction with FIG. 3. At 602, a call is received through the registered mobile device of a user. Then, a call connection is established between the mobile device and the multi-function device. Thereafter, the job submitted by the user is fetched at the multi-function device. Then, an interactive voice response (IVR) unit is automatically activated over the established call to interact with the user through one or more voice-based instructions, at 604. It is then checked for a condition at the multi-function device at 606. The condition at the multi-function device may be when an error occurs at the multi-function device, a condition may be when one or more resources for executing the job are finished at the multi-function device and a condition may be when one or more resources are unavailable at the multi-function device. Based on the condition check, the one or more voice-based instructions are transmitted to the mobile device of the user at 608. The one or more voice-based instructions include continue the job later, initiate a call to an admin user and transfer the job to another multi-function device.

Few examples of the one or more voice-based instructions are discussed herein. In one example, the one or more voice-based instructions may be "An error at the multi-function device has occurred, do you want to continue the job later, then press #1. In second example, the one or more voice-based instructions may be "An error at the multi-function device is occurred, do you want to initiate a call to an admin user to fix the condition, then press #2. In third example, the one or more voice-based instructions may be "An error at the multi-function device is occurred, do you want to transfer the job to another multi-function device, then press #3.

Based on the one or more voice-based instructions, the user submits the required input key through his mobile device. At 610, the input key submitted through the mobile device of the user is received, based on the one or more voice-based instructions. Based on the received input key, an action is taken to fix the condition at 612.

Continuing with the above example, If the user presses #1, then the job is put on hold and is continued later when the condition at the multi-function device is fixed. When the multi-function device is fixed, the interactive voice response (IVR) unit is re-activated automatically and a call to the user is initiated to resume the job. The user proceeds as required.

If the user presses #2, then a call is initiated to the admin user by the multi-function device. For example, the call to an admin user is implemented when some of the consumables (media, staple, toner, etc.) suddenly got depleted. The multi-function device places a call to the admin user at his registered mobile number. Upon calling, one or more voice-based instructions are sent to the mobile device of the admin user to diagnose the multi-function device. The voice-based instructions relate to the condition at the multi-function device. For example, the voice-based instructions may be resources such as papers are finished at the multi-function device, please fill the paper tray. The voice-based instructions may be paper is jammed at the multi-function device, please clear and re-start the machine. The voice-based instructions may be an error at the device is occurred, please check and diagnose the device. Based on the voice-based instructions, the admin user manually checks the multi-function device and fixes the condition. Once fixed, the multi-function device starts functioning. When the multi-function is fixed, the interactive voice response (IVR) unit is re-activated automatically and a call to the user is initiated to resume the job. In other words, the multi-function device calls back the original job owner (the user) to resume the job and the user further follows the IVR options as required.

If the user presses #3, the job is transferred to another multi-function device. Based on the input received from the user, the multi-function device establishes a connection with the printing server to transfer the job to other nearby multi-function device. In other implementations, the multi-function device finds directly and transfers the job to another multi-function device. Another multi-function device is communicatively coupled to the multi-function device. The multi-function device sends information such as job, job attributes, mobile number, user details, and other details required for executing the job at another multi-function device. Upon receiving, another multi-function device executes the job in accordance with the received information. Another multi-function receives the job and starts executing the job according to the received print attributes and finishes executing the job. Post that, one or more voice-based instructions are transmitted indicating the job is successfully completed.

With such job transfer facility between interconnected MFDs facilitates the user to take prompt action in case of any selected multi-function device fails to execute the job due to their internal software or hardware issues or other conditions as discussed above.

Figure 7:
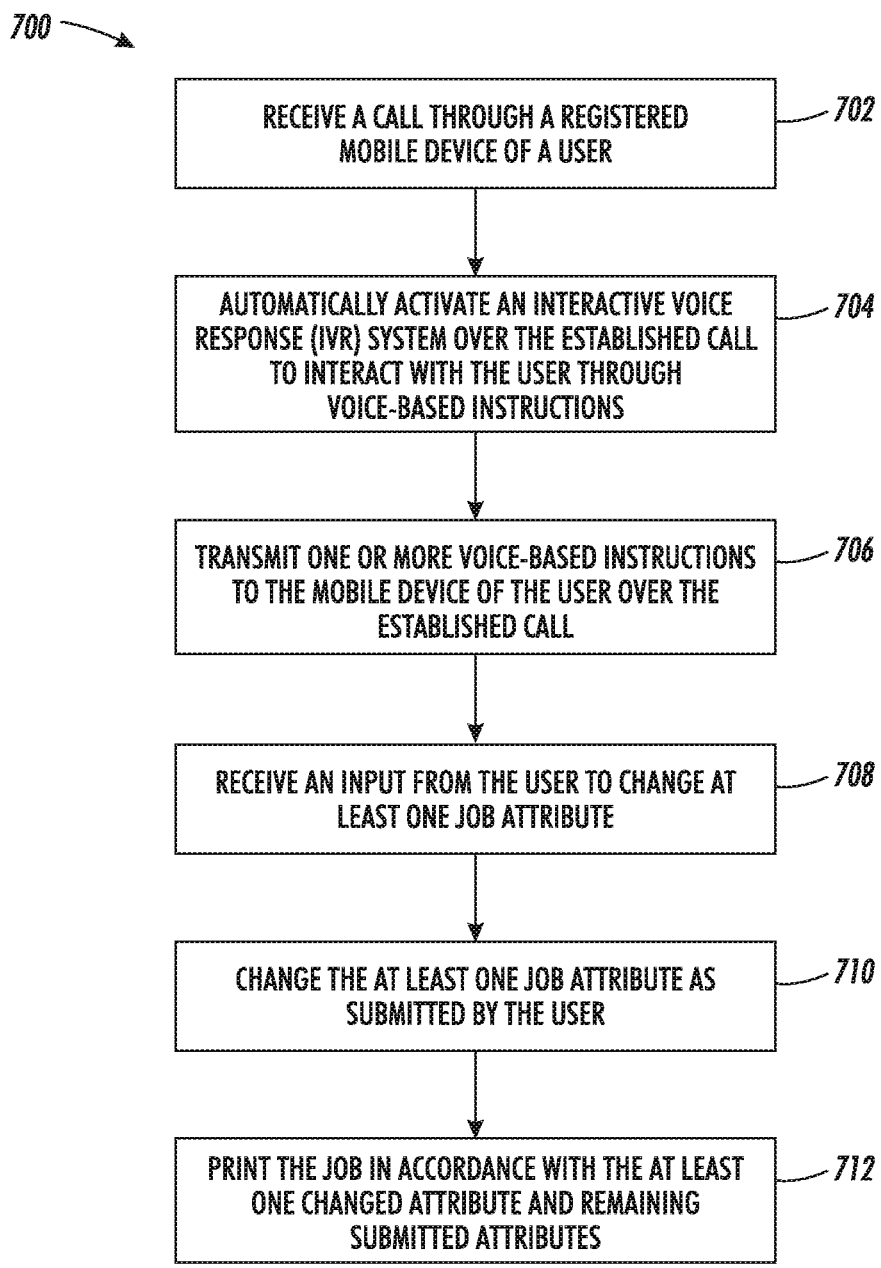

FIG. 7 is a method 700 for real-time assistance by a multi-function device through one or more voice-based instructions. The method begins with when the user submits the job. After submitting the job, the user calls the multi-function device through his mobile device. The mobile device of the user is already registered as discussed in conjunction with FIG. 3. The method includes receiving a call through the registered mobile device of the user at 702. Then, a call connection is established between the mobile device and the multi-function device. Then, a job submitted by the user is fetched at the multi-function device. An interactive voice response (IVR) unit is automatically activated over the established call to interact with the user through one or more voice-based instructions at 704. Then, one or more voice-based instructions are transmitted to the mobile device of the user over the established call, at 706. The one or more voice-based instructions relate to changing at least one job attribute. Based on the one or more voice-based instructions, the user submits the required input key through his mobile device. At 708, the input key to change at least one job attribute is received through the mobile device of the user. Then, the at least one attribute as submitted by the user is changed at 710. Finally, the job is printed in accordance with the at least one changed attribute and remaining submitted/original attributes at 712. The at least one job attribute includes at least one of a number of copies, an output tray, a finishing option, a two-sided printing option, a color or black-white option and an orientation.

Few examples of one or more voice-based instructions are as follows. The one or more voice-based instructions may be Do you wish to change any printing setting feature, then press #1. The further one or more voice-based instructions may be if you want to change from black and white print to color print, then press #3; if you want to change number of copies from 1 to 2, then press #4; if you want to change from single side printing to double side printing then press #5, if you want to change orientation from portrait to landscape then press #6.

It can be considered that the user submits a job including a document. And the attributes are one side print, black and white print, single copy, and portrait orientation. It is further considered that the user presses #1 indicating he wishes to change the attribute. Continuing with the example, it can be considered that the user presses #1. The user further presses #3 indicating he wants to print color copies. In such cases the multi-function device changes this attribute and prints the job in accordance with the changed attributed (color print) and other attributes (one side print, single copy, and portrait orientation) remain as is.

Similar to the method flowchart of FIG. 5, the methods flowcharts 600 and 700 can be incorporated in the form of a non-transitory computer-readable medium comprising instructions executable by a processing resource.

For a person skilled in the art, it is understood that options given in the one or more voice-based instructions are exemplary in nature. More options can be included in the voice-based instructions that allows the user to handle the submitted print jobs successfully without being present at the multi-function device. Likewise, the disclosure can be implemented for any user without limiting the scope.

It may be noted that devices or components may be referred with different referral numerals in different figures. But it is understood that the device or components remain the same with their functionalities, without limiting the scope of the disclosure.

The present disclosure discloses methods and systems for assisting users via interactive voice-based instructions. The voice-based instructions allow users to change at least one job attribute such as print setting feature and/or a multi-function device. And the voice-based instructions provide other options for the user. The methods and systems further provide multi-layered security on handling the submitted jobs. The first layer of security includes verifying mobile numbers associated with respective mobile devices of the users and the second layer of security includes enabling the users to input their passcodes through their mobile devices only (for secure job). An additional layer of security includes transmitting the voice-based instructions to the mobile device of the user i.e., personal device of the user. The methods and systems further increase the convenience and flexibility for all users on handing print jobs in the multi-function device. The disclosure offers greater user experience and helps all users (including visually impaired users and sighted users) to handle their submitted jobs in an effective and easier way. In addition, the methods and systems offer a low-cost solution.

It can be appreciated by those skilled in the art that the use of phrase(s) "is," "are," "may," "can," "could," "will," "should" or the like is for understanding various embodiments of the present disclosure and the phrases do not limit the disclosure or its implementation in any manner.

It is emphasized that the term "comprises" or "comprising" is used in this specification to specify the presence of stated features, integers, steps or components, but does not preclude the addition of one or more further features, integers, steps or components, or groups thereof.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of the manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer-readable tangible, non-transitory medium or also referred to as a processor-readable medium. For example, a server can include one or more computers operating as a web server, database server, or another type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "checking" or "identifying" or "establishing" or "fetching" or "transmitting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for providing real-time assistance by a multi-function device through one or more voice-based instructions, the method comprising:
   receiving a job submitted by a user, wherein the job comprising one or more attributes;
   receiving a call from a mobile device of the user, the mobile device is associated with a mobile number;
   establishing a call connection between the mobile device and the multi-function device;
   checking whether the mobile device is registered with a Light Weight Directory Access Protocol (LDAP) server coupled to the multi-function device, based on the mobile number and user details available with the LDAP server;
   automatically activating an interactive voice response (IVR) unit over the established call to interact with the user through one or more voice-based instructions;
   sending the one or more voice-based instructions to change at least one attribute related to the job, wherein the one or more voice-based instructions to change the at least one attribute related to the job comprises at least: to continue the job later and to initiate a call to a mobile device of an admin user, wherein the one or more voice-based instructions are sent to the mobile device of the user over the established call;
   based on the one or more voice-based instructions, receiving an input key submitted through the mobile device of the user, to change the at least one attribute related to the job;
   based on the received input key, changing the at least one attribute related to the job at the multi-function device in real-time; and
   printing the job in accordance with the at least one changed attribute and remaining original attributes.

2. The method of claim 1, wherein the job is one of a submitted job, a queued job, and a progressing job.

3. The method of claim 1, further comprising overwriting the at least one attribute related to the job in real-time at the multi-function device.

4. The method of claim 1, further comprising putting the job on hold to change the at least one attribute, based on the input key from the user.

5. The method of claim 1, further comprising:
   establishing a communication with a printing server to determine whether the job is submitted by the user; and
   fetching the job at the multi-function device based on the determination.

6. The method of claim 1, wherein changing the at least one attribute comprises changing at least one print setting feature.

7. The method of claim 1, wherein changing the at least one attribute comprises transferring the submitted job to another multi-function device.

8. The method of claim 7, wherein the submitted job is transferred to another multi-function device when at least one of condition occurs, the at least one condition comprises:
when an error occurs at the multi-function device, when one or more resources for executing the job are finished at the multi-function device and when one or more resources are unavailable at the multi-function device.

9. The method of claim 1, wherein the one or more voice-based instructions to change the least one attribute comprise at least one of one or more voice-based instructions to change the at least one print setting feature and one or more voice-based instructions to transfer the job to another multi-function device.

10. The method of claim 1, further comprising sending one or more voice-based instructions to initiate a call to an admin user.

11. The method of claim 10, further comprising automatically initiating a call to a mobile device of an admin user through the multi-function device.

12. The method of claim 11, further comprising sending one or more voice-based instructions to the mobile device of the admin user to diagnose the multi-function device.

13. The method of claim 11, further comprising registering a mobile number of the admin user with the LDAP server.

14. A method for providing real-time assistance by a multi-function device through one or more voice-based instructions, the method comprising:
receiving a call from a registered mobile device of a user;
establishing a call connection between the mobile device and the multi-function device;
fetching a job submitted by the user at the multi-function device, the job comprising one or more job attributes;
automatically activating an interactive voice response (IVR) unit to interact with the user through one or more voice-based instructions;
sending the one or more voice-based instructions to the mobile device of the user over the established call, the one or more voice-based instructions relate to changing at least one job attribute, wherein the one or more voice-based instructions to change the at least one job attribute comprises at least: to continue the job later and to initiate a call to a mobile device of an admin user;
receiving an input key submitted through the mobile device of the user to change the at least one job attribute;
changing the at least one job attribute based on the input key submitted through the mobile device of the user; and
printing the job in accordance with the at least one changed attribute and remaining submitted attributes.

15. The method of claim 14, further comprising overwriting the at least one job attribute related in real-time at the multi-function device.

16. A system, comprising:
a Light Weight Directory Access Protocol (LDAP) server for:
storing user details, a passcode and a mobile number associated with a mobile device of a user; and
authenticating the user based on the mobile number and the user details; and
a multi-function device communicatively coupled to the LDAP server, comprising:
a communication unit for receiving a call from the mobile device of the user;
a controller for:
establishing a call connection between the mobile device and the multi-function device;
checking the status of the job of the user;
automatically activating an interactive voice response (IVR) unit over the established call to interact with the user through one or more voice-based instructions;
changing the at least one attribute related to the job at the multi-function device in real-time; and
printing the job in accordance with the at least one changed attribute and remaining attributes; and
the interactive voice response (IVR) unit for:
sending one or more voice-based instructions to the mobile device of the user over the established call to change the at least one attribute related to the job, wherein the one or more voice-based instructions to change the at least one attribute related to the job comprises at least: to continue the job later and to initiate a call to a mobile device of an admin user; and
based on the one or more voice-based instructions, receiving an input key through the mobile device of the user to change the at least one attribute related to the job.

17. The system of claim 16, wherein the job is one of a submitted job, a queued job, and a progressing job.

18. The system of claim 16, wherein the controller overwrites the at least one attribute related to the job in real-time at the multi-function device.

19. The system of claim 16, wherein the controller puts the job on hold based on the input key to change the at least one attribute.

20. The system of claim 16, wherein changing the at least one attribute comprises changing at least one print setting feature.

21. The system of claim 16, wherein changing the at least one attribute comprises transferring the job to another multi-function device.

22. The system of claim 21, wherein the submitted job is transferred to another multi-function device when at least one of condition occurs when an error occurs at the multi-function device, when one or more resources for executing the job are finished at the multi-function device and when one or more resources are unavailable at the multi-function device.

23. The system of claim 16, wherein the one or more voice-based instructions to change the least one attribute comprise at least one of one or more voice-based instructions to change at least one print setting feature and one or more voice-based instructions to transfer the job to another multi-function device.

24. The system of claim 16, wherein the IVR unit sends one or more voice-based instructions to initiate a call to an admin user.

25. The system of claim 16, wherein the IVR unit automatically initiates a call to a mobile device of an admin user through the multi-function device.

26. The system of claim 25, wherein the IVR unit sends one or more voice-based instructions to the mobile device of the admin user to diagnose and fix the multi-function device.

27. The system of claim 16, wherein the LDAP server registers a mobile number associated with the mobile device of the admin user.

28. A multi-function device, comprising:
a communication unit for receiving a call from a mobile device of a user;
an interactive voice response (IVR) unit for:

sending one or more voice-based instructions to the mobile device of the user to change at least one submitted attribute related to the job; and based on the one or more voice-based instructions, receiving an input key through the mobile device to change the at least one submitted attribute related to the job; and a controller for:

establishing a call connection between the mobile device and the multi-function device;

automatically activating the interactive voice response (IVR) unit over the established call to interact with the user through the one or more voice-based instructions;

checking the status of the job of the user at the multi-function device;

changing the at least one submitted attribute related to the job at the multi-function device in real-time, wherein the one or more voice-based instructions to change the at least one attribute related to the job comprises at least: continuing the job later and initiating a call to a mobile device of an admin user; and printing the job in accordance with the at least one changed attribute and remaining submitted attributes.

29. The multi-function device of claim 28, wherein the one or more voice-based instructions to change the least one submitted attribute comprise at least one of: one or more voice-based instructions to change at least one print setting feature and one or more voice-based instructions to transfer the job to another multi-function device.

30. A non-transitory computer-readable medium comprising instructions executable by a processing resource for:

receiving a job submitted by a user, wherein the job comprising one or more attributes;

receiving a call from a mobile device of the user, the mobile device is associated with a mobile number;

establishing a call connection between the mobile device and the multi-function device;

checking whether the mobile device is registered with a Light Weight Directory Access Protocol (LDAP) server coupled to the multi-function device, based on the mobile number and user details available with the multi-function device;

checking the status of the job of the user at the multi-function device;

automatically activating an interactive voice response (IVR) unit over the established call to interact with the user through one or more voice-based instructions;

sending the one or more voice-based instructions to change at least one submitted attribute related to the job, wherein the one or more voice-based instructions to change the at least one job attribute comprises at least: to continue the job later and to initiate a call to a mobile device of an admin user;

based on the one or more voice-based instructions, receiving an input key submitted through the mobile device to change the at least one submitted attribute related to the job;

changing the at least one submitted attribute related to the job at the multi-function device in real-time; and printing the job in accordance with the at least one changed attribute and remaining submitted attributes.

31. The non-transitory computer-readable medium of claim 30, wherein changing the at least one submitted attribute comprises changing the at least one print setting feature.

32. The non-transitory computer-readable medium of claim 30, wherein changing the at least one submitted attribute comprises transferring the submitted job to another multi-function device.

* * * * *